Sept. 2, 1941.        B. DICK        2,254,937
MASTER CYLINDER PISTON CONSTRUCTION
Filed May 20, 1939
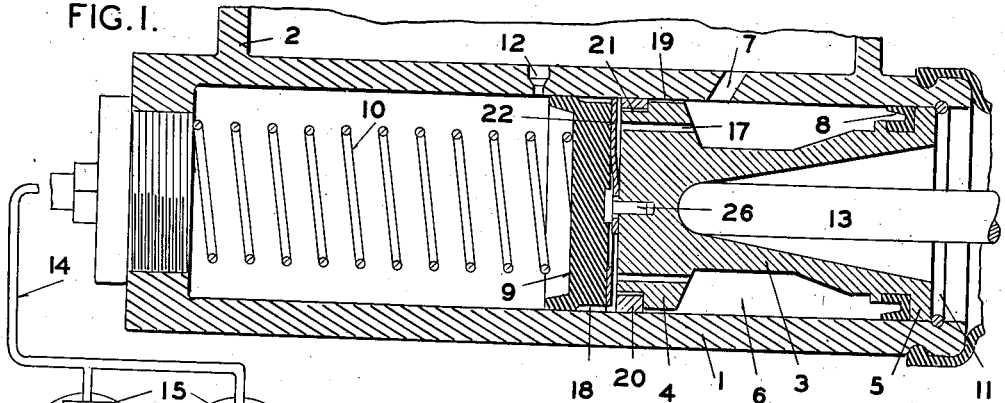
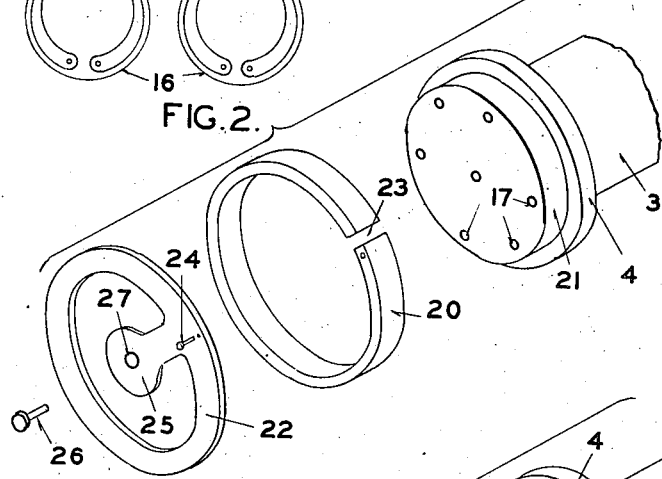
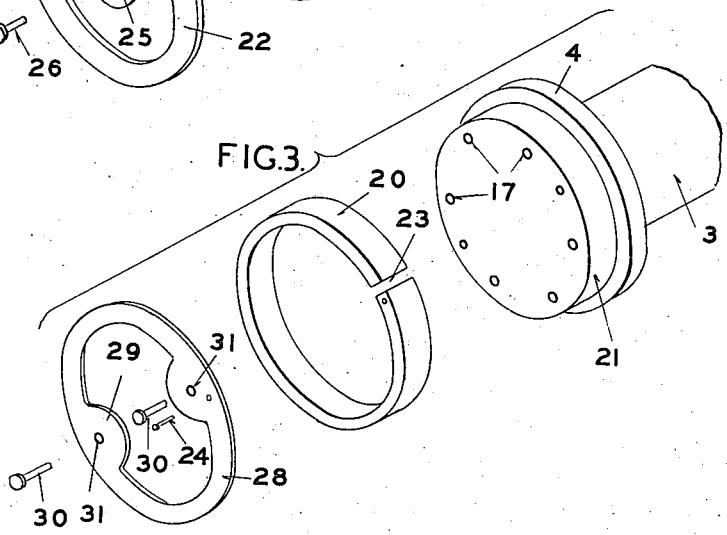
INVENTOR
BURNS DICK
BY
ATTORNEY Patented Sept. 2, 1941

2,254,937

UNITED STATES PATENT OFFICE 2,254,937

MASTER CYLINDER PISTON CONSTRUCTION

Burns Dick, Ferguson, Mo., assignor to Wagner Electric Corporation, St. Louis, Mo., a corporation of Delaware Application May 20, 1939, Serial No. 274,692

9 Claims. (Cl. 309—33)

My invention relates to compensating master cylinders for creating fluid pressure and more particularly to a piston construction for use therein.

One of the objects of my invention is to provide an improved master cylinder piston construction for use with a yieldable packing cup which will prevent said cup from being "cut," "chewed" or otherwise damaged during operation while at the same time not interfering with the flow of fluid from one side of the piston to the other and past the cup during a retractile stroke of the piston.

A more specific object of my invention is to provide a master cylinder piston with a split expansible piston ring for preventing the flexible packing cup from being forced into the usual clearance space between the piston and its cylinder and to associate with said ring and piston a thin plate for covering the gaps between the ring and piston and between the adjacent ends of the split ring, which plate will also be so associated with the compensating passages in the piston that the cup cannot be forced therein yet fluid under certain conditions will be free to pass through the passages.

Other objects of my invention will become apparent from the following description taken in connection with the accompanying drawing in which Figure 1 is a cross-sectional view of a master cylinder device embodying my invention; Figure 2 is a perspective view of the piston head and associated parts prior to assembly; and Figure 3 is a view similar to Figure 2 but showing a modified construction.

In fluid pressure systems such as hydraulic brake systems which employ a master cylinder device for creating the pressure for operating the fluid motors, there is associated with the head of the master cylinder piston, a yieldable packing cup which is usually made of rubber, rubber compound, or synthetic rubber. In order that the piston may freely move within the cylinder, a clearance is provided between the piston and cylinder wall, which clearance increases as the piston and cylinder wall wear. When the piston is actuated to place the fluid in the system under pressure, the material of the cup will flow and extrusion will take place, thereby causing the material to enter the clearance space between the piston and the cylinder wall. The amount of extrusion will depend upon the grade of material and the fluid pressure effective on the cup. Thus, as the piston is reciprocated, it often happens that the portion of the cup which is extruded or forced into the clearance between the piston and the cylinder wall is "chewed" or "sheared off," thus decreasing the efficient life of the cup. Also, if the resiliency of the material has decreased, particles may drop off the extruded part of the cup.

The head of the piston is also provided with passages for permitting fluid at the rear of the head to pass to the forward side of the piston and then past the cup to thus prevent the establishment of sub-atmospheric pressure in the system and causing air to be drawn therein. Unless something is provided to cover the open ends of these passages, the packing cup will be forced therein and the material cut when the packing cup is subjected to fluid under pressure.

In accordance with my invention I have provided means which will prevent any portion of the cup from being forced into the clearance between the piston and the cylinder wall and also from being forced into the open ends of the passages through the piston head, thus eliminating the possibility of the cup becoming damaged whereby its useful life will be extended.

Referring to Figures 1 and 2, numeral 1 indicates the cylinder of a master cylinder device and 2 the reservoir above the cylinder. Within the cylinder is a reciprocable spool-type piston 3 having a head 4 and a rear guide flange 5 forming an annular space or chamber 6 therebetween which is in constant communication with the reservoir by a passage 7. The rear guide flange of the piston has associated therewith an annular packing element 8 for preventing fluid from leaking out of chamber 6. The head 4 of the piston has associated therewith an annular packing cup 9 and a spring 10 interposed between the end of the cylinder and this packing cup normally biases the piston to a retracted position against the stop 11. When the piston is in its retracted position, the packing cup 9 uncovers a porthole 12 whereby fluid may freely pass between the portion of the cylinder ahead of the piston and the reservoir to thus compensate for expansion and contraction of the fluid employed in the system. The piston is moved forward by a piston rod 13 to thus cause the fluid in the forward end of the cylinder, the conduit 14, and the fluid motors 15 to be placed under pressure to actuate the brake assemblies 16.

The head 4 of the piston is provided with circumferentially spaced passages 17 whereby fluid may flow from chamber 6 to the forward side of the piston and then through grooves 18 in the periphery of the packing cup 9 to the cylinder ahead of the piston. This flow of fluid from chamber 6 to the cylinder ahead of the packing cup will take place during the retractile stroke of the piston and then only if there is a subatmospheric pressure created in the cylinder ahead of the piston. The cylinder is thus maintained full of fluid at all times and air is prevented from being drawn into the system, especially at the fluid motors 15.

The piston, in order to operate freely within the cylinder, has a clearance between its head and the cylinder wall which is indicated at 19 in slightly exaggerated condition. This clearance may vary considerably when the parts are new depending upon the material used in the piston and the cylinder. If the materials of the piston and cylinder have different coefficients of expansion, the clearance would be greater than if the materials were the same. Wear of the surfaces of the piston and the cylinder wall during operation of the piston also results in the clearance being increased. If, during the life of the master cylinder device, it is found necessary to hone the cylinder in order to maintain its surface smooth, this will also cause the clearance to be increased.

In order to prevent the material of the packing cup 9 from being forced into the clearance 19 when fluid in the cylinder ahead of the packing cup is placed under pressure, there is provided a split resilient piston ring 20 mounted upon a reduced cylindrical portion 21 of the piston head. The ring will spring outwardly into engagement with the wall of the cylinder and maintain this engagement at all times notwithstanding any increase in diameter of the cylinder caused either by wear or a honing operation. The ring will thus "block off" the clearance space and establish a zero clearance between the ring and the cylinder wall throughout the circumference of the ring, thus preventing the cup from being forced into the clearance.

By the use of the split ring on the piston head, there may be present a clearance or gap between the reduced cylindrical portion and the inner surface of the ring, which gap will increase as the parts wear. In order to prevent any portion of the cup from being forced into this gap, there is provided a thin metal plate 22 having a thickness of only a few thousandths of an inch, to thus prevent any cutting of the cup, notwithstanding the fact that the plate may have sharp edges or the cup may be forced down along side the edge of the plate.

Since it is necessary to make the diameter of the plate slightly less than the diameter of the cylinder in order that it may not interfere with the reciprocation of the piston, it may happen that the plate would not at all times cover the gap 23 between the ends of the ring, thus leaving a portion of this gap exposed and permitting the cup to be forced therein causing damage to the cup. In order to insure that the plate will at all times cover this gap 23, the plate is connected to one end of the ring by a pin 24 and in such a manner that the edge of the plate at the point of connection will be flush with the outer peripheral surface of the ring. It is thus seen that the ring will be permitted to have free expansible action yet the plate will be held in a position to at all times cover the gap 23.

The plate 22 is shown as an annular member and the radial width thereof is sufficient to overlie the open ends of the passages 17, thus preventing the cup from being forced into these passages and becoming cut. Provision is also made to permit this plate to move slightly away from the open ends of the passages and thus not obstruct the flow of fluid through the passages. This is accomplished by providing an inwardly extending finger 25 on the annular plate and so biasing this finger with respect to the plate that the plate will normally be spaced from the piston head a very slight distance. The finger is secured to the piston head by a headed pin 26 and the hole 27 in the finger is oversized with respect to the pin. The head of the pin does not tightly clamp the finger to the piston and thus the plate can shift slightly with respect to the piston to assume its proper position and to also follow any expansion of the ring. When the piston is moved forward to place fluid in the system under pressure, the packing cup will force the plate back against the head of the piston. However, when the piston is retracted, the resiliency of the connecting finger 25 will tend to move the plate away from the surface of the piston head and thus permit any fluid to freely pass through the passages 17 past the plate and then past the cup into the forward portion of the cylinder.

From the foregoing description it is seen that I have provided means for "blocking off" the clearance space between the head of the piston and the cylinder wall and thus prevent the cup from being damaged. I have also provided means which prevents the cup from being forced into any gap which may be present between the ring and the piston and also between the ends of the ring. This means comprises a very thin plate which also has the additional function of covering the passages through the piston and preventing the cup from being forced into these passages and becoming cut or otherwise damaged.

In Figure 3 I have shown a slightly modified construction. The piston head 4 and piston ring 20 are the same as in the previously described construction. The thin metal plate 28 is also annular and is attached to one end of the ring by the pin 24 in the same manner as previously described. Instead of employing a resilient finger for connecting the plate to the head of the piston, the plate is provided with diametrically opposite attaching ears 29 which are connected to a piston head by pins 30 passing through oversize openings 31. The heads of the pins are so associated with the plate that the plate can have slight axial movement with respect to the head of the piston to thus permit the plate to become spaced from the head of the piston and thus allow fluid to flow freely through the passages 17 in the head of the piston. The oversize openings 31 permit the plate to follow the expansion of the ring.

Being aware of the possibility of other modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In fluid pressure apparatus of the class described, a piston construction for reciprocation in a cylinder and adapted to have associated with its head a yieldable packing cup directly acted on by fluid pressure, said construction comprising a piston having a passage therethrough spaced from the periphery for permitting fluid to flow from one side of the piston to the other, a split resilient ring for cooperation with the cylinder wall and associated with the head of the piston and having its forward surface substantially flush with the forward surface of the piston head, and a thin member associated with the piston head and overlying the gap between the piston and the inner surface of the piston ring and also the open end of the passage through the piston.

2. In fluid pressure apparatus of the class described, a piston construction for reciprocation in a cylinder and adapted to have associated with its head a yieldable packing cup, said construction comprising a piston having a passage therethrough spaced from the periphery for permitting fluid to flow from one side of the piston to the other, a split resilient ring for cooperation with the cylinder wall and associated with the head of the piston and having its forward surface substantially flush with the forward surface of the piston head, a thin member associated with the piston head and overlying the gap between the piston and the inner surface of the piston ring and also the passage through the piston, and means for securing the thin member to the piston ring adjacent one of the ring ends to maintain said member in a position where it will overlie the gap between the ends of the split ring.

3. In fluid pressure apparatus of the class described, a piston construction for reciprocation in a cylinder and adapted to have associated with its head a yieldable packing cup directly acted on by fluid pressure, said construction comprising a piston having a passage therethrough spaced from the periphery for permitting fluid to flow from one side of the piston to the other, a split resilient ring for cooperation with the cylinder wall and associated with the head of the piston and having its forward surface substantially flush with the forward surface of the piston head, a thin member associated with the piston head and overlying the gap between the piston and the inner surface of the piston ring and also the open end of the passage through the piston, and means for connecting the thin member to the piston but permitting said member to move away from the piston head surface.

4. In fluid pressure apparatus of the class described, a piston construction for reciprocation in a cylinder and adapted to have associated with its head a yieldable packing cup, said construction comprising a piston having a passage therethrough spaced from the periphery for permitting fluid to flow from one side of the piston to the other, a split resilient ring for cooperation with the cylinder wall and associated with the head of the piston and having its forward surface substantially flush with the forward surface of the piston head, a thin member associated with the piston head and overlying the gap between the piston and the inner surface of the piston ring and also the open end of the passage through the piston, means for securing the thin member to the piston ring adjacent one of the ring ends to maintain said member in a position where it will overlie the gap between the ends of the split ring, and means for connecting the thin member to the piston to be movable therewith but permitting said member to move away from the piston head surface.

5. In fluid pressure apparatus of the class described, a piston construction for reciprocation in a cylinder and adapted to have associated with its head a yieldable packing cup directly acted on by fluid pressure, said construction comprising a piston having a passage therethrough spaced from the periphery for permitting fluid to flow from one side of the piston to the other, a split resilient ring for cooperation with the cylinder wall and associated with the head of the piston and having its forward surface substantially flush with the forward surface of the piston head, a thin member associated with the piston head and overlying the gap between the piston and the inner surface of the piston ring and also the open end of the passage through the piston, said thin member having a biased resilient portion, and means for so securing the portion to the piston head that the thin member will be normally yieldably held slightly spaced from the open end of the passage.

6. In fluid pressure apparatus of the class described, a piston construction for reciprocation in a cylinder adapted to have associated with its head a yieldable packing cup directly acted on by fluid pressure, said construction comprising a piston having a plurality of circumferentially spaced passages therethrough for permitting fluid to flow from one side of the piston to the other, said piston head having a reduced cylindrical portion adjacent its forward end surface, a split resilient ring surrounding the reduced cylindrical portion for cooperation with the cylinder wall, the forward end surface of said ring being flush with the end surface of the piston, and a thin plate connected to the piston head and overlying the gap between the piston and the inner surface of the piston ring and also the open ends of the passages through the piston to thereby prevent any portion of the packing cup from being forced into said gap or the passages, the connection of said plate with the piston head being such that the plate may assume a position spaced from the open ends of said passages when fluid pressure it not being developed by the piston.

7. In fluid pressure apparatus of the class described, a piston construction for reciprocation in a cylinder and adapted to have associated with its head a yieldable packing cup directly acted on by fluid pressure, said construction comprising a piston having a passage therethrough spaced from the periphery for permitting fluid to flow from one side of the piston to the other, a split resilient ring for cooperation with the cylinder wall and associated with the head of the piston and having its forward surface substantially flush with the forward surface of the piston head, a thin plate associated with the piston head and overlying the gap between the piston and the inner surface of the piston ring and also the open end of the passage through the piston, and means including headed pins carried by the piston head for connecting the plate to the head of the piston, the holes in the plate for receiving said pins being oversize and the head of the pins being so associated with the plate that the plate is free to move slightly away from the piston head surface.

8. In a piston construction for reciprocation in a cylinder, said construction comprising a piston provided with a head and a rearwardly spaced guide portion forming an annular fluid containing recess, means forming a passage through the cylinder head for permitting fluid to flow from the annular recess to the forward side of the piston, said piston head having a reduced cylindrical portion adjacent the forward end surface, a split resilient ring surrounding the reduced cylindrical portion and adapted to cooperate with the cylinder will, a thin plate connected to the piston head and overlying the gap between the cylindrical portion of the piston and the inner surface of the piston ring and also the open end of the passage through the piston, the connection of said plate with the piston head permitting the plate to move relative to the head and away from the open end of the passage, and means for securing the plate to one end of the piston ring and in such a manner that the plate will overlie the gap between the ends of the piston ring.

9. In a piston construction for reciprocation in a cylinder, said construction comprising a piston provided with a head and a rearwardly spaced guide portion forming an annular fluid containing recess, means forming a passage through the piston head for permitting fluid to flow from the annular recess to the forward side of the piston, said piston head having a reduced cylindrical portion adjacent the forward end surface, a split resilient ring surrounding the reduced cylindrical portion and adapted to cooperate with the cylinder wall, the forward end surface of said ring being flush with the forward end surface of the piston, a thin plate carried by the piston head and overlying the gap between the cylindrical portion of the piston and the inner surface of the piston ring and also the open end of the passage through the piston, and means for mounting said plate on the piston head so that it is free to have limited relative movement with the piston head and position itself away from the open end of the passage.

BURNS DICK.